(12) United States Patent
Verrall et al.

(10) Patent No.: US 6,544,605 B1
(45) Date of Patent: *Apr. 8, 2003

(54) COMBINATION OF OPTICAL ELEMENTS

(75) Inventors: Mark Verrall, Dorset (GB); Jeremy Ward, Poole (GB); James Hanmer, Hampshire (GB); David Coates, Dorset (GB)

(73) Assignee: Merck Patent Gesellschaft mit beschrankter Haftung, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/230,335

(22) PCT Filed: Jul. 11, 1997

(86) PCT No.: PCT/EP97/03676

§ 371 (c)(1),
(2), (4) Date: Jan. 25, 1999

(87) PCT Pub. No.: WO98/04651

PCT Pub. Date: Feb. 5, 1998

(30) Foreign Application Priority Data

Jul. 26, 1996 (EP) .............................. 96112100

(51) Int. Cl.⁷ ..................... C09K 19/38; C09K 19/52; G02F 1/133
(52) U.S. Cl. ................. 428/1.3; 252/299.01; 252/585; 349/117
(58) Field of Search ............. 252/299.01, 582, 252/585; 428/1.3, 1.31; 349/117

(56) References Cited

U.S. PATENT DOCUMENTS 5,354,498 A * 10/1994 Akashi et al. ......... 252/299.01
5,414,546 A * 5/1995 Fergason ................ 359/73
5,506,704 A * 4/1996 Broer et al. ............ 359/63
5,688,436 A * 11/1997 Ohnishi et al. ........ 252/299.01
5,769,393 A * 6/1998 Kobayashi et al. .... 252/299.01
5,770,107 A * 6/1998 Hassall et al. ......... 252/299.6
5,833,880 A * 11/1998 Siemensmeyer et al. ..................... 252/299.64
5,863,457 A * 1/1999 Hasebe et al. ......... 252/299.01
5,942,157 A * 8/1999 Sutherland et al. ......... 252/582
5,948,486 A * 9/1999 Sage et al. ............... 428/1
5,989,461 A * 11/1999 Coates et al. ............ 252/585
6,007,745 A * 12/1999 Coates et al. ............ 252/585
6,099,758 A * 8/2000 Verrall et al. ............ 252/585
6,183,822 B1 * 2/2001 Farrand et al. ........... 428/1.1
6,217,948 B1 * 4/2001 Verrall et al. ............ 427/492
6,217,955 B1 * 4/2001 Coates et al. ............ 428/1.1
6,291,035 B1 * 9/2001 Verrall et al. ............ 428/1.3

FOREIGN PATENT DOCUMENTS

| EP | 606940  | 1/1994 |
| EP | 643121  | 3/1995 |
| GB | 2306470 | 9/1996 |
| WO | 9509379 | 9/1994 |
| WO | 9625470 | 2/1996 |

* cited by examiner

Primary Examiner—Shean C. Wu
(74) Attorney, Agent, or Firm—Millen, White, Zelano & Branigan, P.C.

(57) ABSTRACT

The invention relates to a combination of optical elements comprising at least one optical retardation film and at least one broadband reflective polarizer, characterized in that the optical retardation film is comprising at least one layer of an anisotropic polymer material having an optical symmetry axis substantially parallel to the plane of the layer, said optical retardation film being obtainable by polymerization of a mixture of a polymerizable mesogenic material comprising: a) at least one reactive mesogen having at least one polymerizable functional group; b) an initiator, c) optionally a non-mesogenic compound having two or more polymerizable functional groups; and d) optionally a stabilizer; and relates to an optical retardation film used in said combination of optical elements and to a liquid crystal display comprising said combination of optical elements.

67 Claims, 4 Drawing Sheets

COMBINATION OF OPTICAL ELEMENTS

The invention relates to a combination of optical elements comprising at least one optical retardation film and at least one broadband reflective polarizer, characterized in that the optical retardation film is comprising at least one layer of an anisotropic polymer material having an optical symmetry axis substantially parallel to the plane of the layer, said optical retardation film being obtainable by polymerization of a mixture of a polymerizable mesogenic material comprising a) at least one reactive mesogen having at least one polymerizable functional group,
b) an initiator,
c) optionally a non-mesogenic compound having two or more polymerizable functional groups, and
d) optionally a stabilizer.

The invention further relates to a means to produce substantially linear polarized light comprising a combination of optical elements as described above. The invention also relates to an optical retardation film used in such a combination of optical elements and to a liquid crystal display comprising such a combination of optical elements.

Figure 1A:
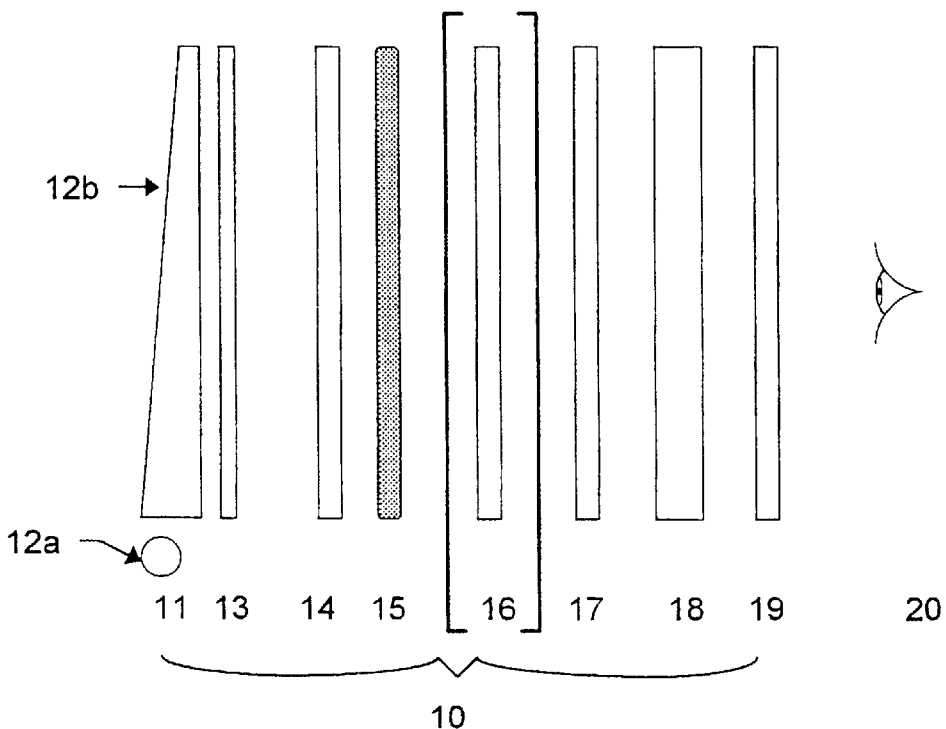
FIGS. 1a and 1b show a display device according to preferred embodiments of the present invention.

The European Patent Application EP 0 606 940-A1 discloses a cholesteric reflective polarizer that produces circular polarized light of a high luminance over a broad range of wavelengths. However, since for most applications, e.g. in liquid crystal displays, polarizers producing linear polarized light are needed, EP 0 606 940 further describes the combined use of the broadband cholesteric polarizer together with a quarter wave foil or plate (QWF), which transforms the circular polarized light transmitted by the cholesteric polarizer into linear polarized light.

The laid open WO 96/02016 discloses a linear polarizer consisting of a combination of the broadband cholesteric polarizer described above and a quarter wave plate comprising a stretched film of an isotropic polymer with negative birefringence.

However, when a liquid crystal display comprising a cholesteric polarizer like those described in EP 0 606 940 and WO 96/02016 is watched under an increasing viewing angle, its optical properties, like e.g. the luminance and the contrast ratio usually deteriorate.

It has therefore been desired to have available an optical retardation film that, when used together with a broad waveband cholesteric reflective polarizer, like e.g. those described in EP 0 606 940 and WO 96/02016 as mentioned above, produces substantially linear polarized light and that improves the optical properties of the reflective polarizer over a wide range of viewing angles.

Optical retardation films have been described in prior art. Usually uniaxially stretched films of a prefabricated isotropic or LC polymer like those described in the above mentioned WO 96/02016 are used for this purpose.

Optical retardation films made of polymerized mixtures of reactive mesogens have also been mentioned. Research Disclosure, May 1992, p.411, No. 33799 describes an achromatic wave plate made of a stack of two layers between glass substrates which under irradiation with light shows a net retardation of ¼ of the value of the wavelength of light incident on the stack. Each of the layers consists of an anisotropic polymer network which is obtained by curing an oriented layer of a mesogenic diacrylate.

However, polymerizable liquid crystalline compositions containing only one polymerizable compound as disclosed in the above mentioned Research Disclosure in general exhibit high or even very high melting points, which in turn requires high temperatures for alignment and polymerization, which is a serious drawback when manufacturing such layers.

Furthermore, the process of manufacturing a quarter wave plate as described in the above mentioned Research Disclosure is complicated as it requires that the two layers are coated, aligned and cured in two separate steps. This is especially a disadvantage for mass production, since the first of the films is used as a substrate for producing the second film, which significantly increases the costs in case production losses occur when manufacturing the second layer, or requires more sophisticated production procedures and controls.

Furthermore, the above mentioned document only discloses the use of glass substrates for the production of the quarter wave plate, but does not teach a method of producing of a quarter wave plate as a flexible film with a large area, which is most desired for a large scale production and for many applications.

Consequently there has been a considerable demand for an optical retardation film that, when used together with a broad waveband reflective polarizer, enhances the optical properties of the polarizer over a wide range of viewing angles, that is easy to fabricate in large scale as a flexible film with a large area and does not have the disadvantages of the prior art optical retardation films as discussed above.

One of the aims of the present invention is to provide an optical retardation film having these properties. Another aim of the invention is to provide a combination of optical elements comprising such an optical retardation film and a broadband reflective polarizer. Yet another aim of the invention is a liquid crystal display device comprising a liquid crystal cell and such a combination of optical elements. Other aims of the present invention are immediately evident to the person skilled in the art from the following detailed description.

It has been found that these aims can be achieved by providing an optical retardation film and a combination of optical elements comprising such an optical retardation film and a broadband reflective polarizer according to the present invention.

The object of the invention is a combination of optical elements comprising at least one optical retardation film and at least one broadband reflective polarizer, characterized in that the optical retardation film comprises at least one layer of an anisotropic polymer material having an optical symmetry axis substantially parallel to the plane of the layer, said optical retardation film being obtainable by polymerization of a mixture of a polymerizable mesogenic material comprising a) at least one reactive mesogen having at least one polymerizable functional group,
b) an initiator,
c) optionally a non-mesogenic compound having two or more polymerizable functional groups, and
d) optionally a stabilizer.

In a preferred embodiment of the present invention, the bandwidth of the wavelength band reflected by the broadband reflective polarizer is at least 100 nm.

In another preferred embodiment of the present invention the retardation of the optical retardation film is from 50 to 250 nm.

In another preferred embodiment of the present invention, the combination of optical elements additionally comprises a compensation film comprising a layer of an anisotropic polymer material with a homeotropic or tilted homeotropic orientation, the compensation film being positioned adjacent to either side of the optical retardation film.

In another preferred embodiment of the present invention, the combination of optical elements additionally comprises a linear polarizer, arranged in such a manner that the optical retardation film and, if present, the compensation film are positioned between the broadband reflective polarizer and the linear polarizer.

Another object of the present invention is a means to produce substantially linear polarized light comprising the following components
I) a combination of optical elements comprising at least one optical retardation film and at least one broadband reflective polarizer and optionally a linear polarizer and a compensation film as described above,
II) a radiation source, and
III) optionally a diffusor adjacent to the radiation source,
wherein the components I to III are arranged in such a manner that the broadband reflective polarizer of the combination of optical elements I is facing the radiation source II or, if present, the diffusor III.

Another object of the present invention is an optical retardation film which comprises at least one layer of an anisotropic polymer with an optical symmetry axis substantially parallel to the plane of the layer and which can be used in the combination of optical elements as described above and below, said optical retardation film being obtainable by
A) coating a mixture of a polymerizable mesogenic material comprising
  a) at least one reactive mesogen having at least one polymerizable functional group,
  b) an initiator,
  c) optionally a non-mesogenic compound having two or more polymerizable functional groups, and
  d) optionally a stabilizer
on a substrate or between two substrates in form of a layer,
B) aligning the polymerizable mesogenic material such that the optical symmetry axis is substantially parallel to the plane of the, layer,
C) polymerizing said mixture by exposing it to heat or actinic radiation,
D) optionally repeating the steps A), B) and C) at least one more time, and
E) optionally removing the substrate or, if present, one or two of the substrates from the polymerized material, In a preferred embodiment of the present invention, the substrate onto which the polymerizable mesogenic material is coated in step B) is a plastic sheet or film.

In another preferred embodiment of the present invention, the alignment of the polymerizable mesogenic material is achieved by directly rubbing at least one of the substrates onto which the polymerizable mesogenic material is coated in step B).

In another preferred embodiment of the present invention, the mixture of the polymerizable mesogenic material comprises at least one reactive mesogen having one polymerizable functional group and at least one polymerizable mesogen having two or more polymerizable functional groups.

In yet another preferred embodiment of the present invention, the reactive mesogens comprised in the inventive mixture of the polymerizable mesogenic material as described above and below are compounds of formula I

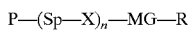
P—(Sp—X)$_n$—MG—R    I wherein
P is a polymerizable group,
Sp is a spacer group having 1 to 20 C atoms,
X is a group selected from —O—, —S—, —CO—, —COO—, —OCO—, —OCOO— or a single bond,
n is 0 or 1,
MG is a mesogenic or mesogenity supporting group, preferably selected according to formula II

—(A$^1$—Z$^1$)$_m$—A$^2$—Z$^2$—A$^3$—    II wherein
A$^1$, A$^2$ and A$^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl,
Z$^1$ and Z$^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond and
m is 0, 1 or 2,
and
R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—.

Another object of the present invention is a liquid crystal display device comprising a liquid crystal cell and a means to produce substantially linear polarized light comprising a combination of optical elements, said combination comprising an optical retardation film as described above and below.

The retardation of the inventive optical retardation film is preferably ranging from 50 to 250 nm, very preferably from 60 to 200 nm, most preferably from 70 to 170 nm.

The optical retardation film according to the present invention is preferably used in a combination of optical elements together with a broadband reflective polarizer.

When using this combination, light that is substantially linearly polarized can be produced.

The bandwidth of the wavelength band reflected by the reflective polarizer according to the inventive combination of optical elements is at least 100 nm, preferably at least 150 nm, most preferably at least 200 nm, ideally 250 nm or larger.

Preferably the bandwidth of the reflective polarizer covers the spectrum of visible light.

In another preferred embodiment of the present invention, the optical retardation film according to the present invention is used together with a broadband reflective polarizer, wherein the retardation of the optical retardation film is substantially 0.25 times a wavelength reflected by the reflective polarizer, so that the optical retardation film serves as a quarter wave retardation film (QWF).

The term 'a wavelength reflected by the reflective polarizer' in this connection is indicating a wavelength of a value of the FWHM (full width half maximum) of the wavelength band reflected by the reflective polarizer.

In a preferred embodiment of the present invention this wavelength is selected from the range of the center wavelength ±95%, in particular ±70%, most preferably ±50% of the HWHM (half width half maximum, which is 0.5 times the value of the FWHM) of the wavelength band reflected by the reflective polarizer.

In another preferred embodiment of the present invention this wavelength is ranging from the center wavelength plus 50% of the HWHM to the centre wavelength plus 99% of the HWHM of the wavelength band reflected by the reflective polarizer.

In another preferred embodiment of the present invention this wavelength is ranging from the centre wavelength minus 50% of the HWHM to the centre wavelength minus 99% of the HWHM of the wavelength band reflected by the reflective polarizer.

Another preferred embodiment of the present invention is characterized in that the combination of optical elements additionally comprises a compensation film in order to compensate the viewing angle dependence of the phase retardation of light transmitted by the optical retardation film and/or the reflective polarizer. The compensation film can be positioned adjacent to either side of the optical retardation film.

Preferably a compensation film is used in which the phase retardation is opposite in sign and substantially equal in magnitude to the phase retardation of the reflective polarizer over a wide range of viewing angles.

Particularly preferably a compensation film is used that comprises a layer of an anisotropic polymer material with a homeotropic or tilted homeotropic orientation.

Light incident on the broadband reflective polarizer is transformed into circularly polarized light. However, due to the angle dependence of the phase retardation of at least one of the optical elements of the inventive combination comprising the reflective polarizer, the optical retardation film and optionally the compensation film a part of the light passing through these optical elements will become elliptically polarized. This part of the light can lead to undesired reduction of the contrast of the display.

Therefore in a preferred embodiment of the present invention a linear polarizer is provided in the optical path of the display behind the optical components of the combination mentioned above in order to block the part of light that is not ideally polarized.

As a linear polarizer a commercially available polarizer can be used. In a preferred embodiment of the present invention the linear polarizer is a low contrast polarizer. In another preferred embodiment of the present invention the linear polarizer is a dichroic polarizer.

Preferably the linear polarizer is positioned such that the angle between the optical axis of the linear polarizer and the major optical axis of the inventive optical retardation film is in a range from 30 to 60 degrees, especially preferably from 40 to 50 degrees.

The inventive optical retardation film comprises a layer of a polymerized mesogenic material and is characterized by a significantly high birefringence. Furthermore, the optical properties of the optical retardation film, like e.g. the birefringence, can be controlled by variation of the type and ratio of the reactive mesogens in the polymerizable material.

For a liquid crystal display comprising a broad band reflective polarizer and an optical retardation film of the state of the art, like e.g. a quarter wave film (QWF) made of stretched PVA, the luminance at normal incidence (viewing angle 0°) and at low values of the viewing angle is increased compared to a liquid crystal display comprising the reflective polarizer alone without an optical retardation film.

However, as the display comprising the a broad band reflective polarizer and a QWF as mentioned above is viewed under an increasing angle, the increasing phase retardation by the QWF itself causes a reduction to the luminance, coinciding with the value measured for the display comprising the reflective polarizer as a single component at a certain angle. This angle is referred to as the 'cross-over angle' $\alpha_c$.

When using an inventive optical retardation film instead of a conventional QWF in the liquid crystal display, the cross-over angle $\alpha_c$ increases significantly. In other words, the brightness enhancement, i.e., the increase of luminance at low viewing angles, that was achieved by using the reflective polarizer is now extended also to large viewing angles.

The cross over angle $\alpha_c$ of a display comprising a combination of optical elements comprising an optical retardation film and a broadband reflective polarizer according to the present invention is preferably 25° or larger, particularly preferably 30° or larger, very particularly preferably 35° or larger in all directions of observation.

The optical retardation films according to the present invention comprise at least one layer of an anisotropic polymer having a symmetry axis that is substantially parallel to the plane of the layer. The term substantially parallel indicates in the foregoing and the following, that the optical symmetry axis of said layer has a tilt angle relative to the plane of the layer being in the range from 0 to 25 degrees, preferably 0 to 15 degrees, in particular from 0 to 10 degrees. Especially preferred are tilt angles from 0 to 5 degrees, in particular tilt angles of approximately 0 degrees.

Another object of the present invention is a means to produce substantially linear polarized light comprising a combination of optical elements as described in the foregoing and the following and additionally comprising a radiation source, which is positioned on the side of the reflective polarizer not facing the other optical elements of the above mentioned combination.

As a radiation source preferably a standard backlight for liquid crystal displays, like e.g. a side-lit or a meander type backlight, can be used. These backlights typically comprise a lamp, a reflector, a light guide and optionally a diffuser.

The radiation source can also consist of a reflector that reflects radiation generated outside the means to produce substantially linear polarized light. The display device according to the present invention can then be used as a reflective display.

The function of the inventive combination of optical elements is further explained by FIG. 1a, which shows a display device according to a preferred embodiment of the present invention as an example that should not limit the scope of the invention. The main direction of light following the optical path is from the left side to the right side. The display device 10 consists of a side-lit backlight unit 11 with a lamp 12a and a combined light guide and reflector 12b, a diffusor 13 and a polarizer combination consisting of a reflective polarizer 14 comprising a layer of a liquid crystalline material with a helically twisted molecular orientation, the inventive optical retardation film 15, optionally a compensation film 16 and a linear polarizer 17. The figure further depicts a liquid crystal cell 18 and a second linear polarizer 19 behind the display cell.

Light emitted from the backlight 11 interacts with the molecular helix structure of the reflective polarizer 14 with the result that 50% of the intensity of the light incident on the reflective polarizer is transmitted as circular polarized light that is either right-handed or left-handed circular polarized depending on the twist sense of the molecular helix structure of the reflective polarizer, whereas the other 50% of the incident light is reflected as circular polarized light of the opposite handedness. The reflected light is depolarized by the backlight and redirected by the reflector 12b onto the reflective polarizer 14. In this manner, theoretically 100% of the light of a broad range of wavelengths emitted from the backlight 11 is converted into circularly polarized light.

The main part of the transmitted component is converted by the inventive optical retardation film 15 into linear polarized light, which is then compensated by the compensation film 16, if present, and being-transmitted by the linear polarizer 17, whereas light which is not completely transferred into linear polarized light by the optical retardation film 15, such as elliptically polarized light, is not transmitted by the linear polarizer 17. The linear polarized light then passes through the display 18 and the second linear polarizer 19 to reach the viewer 20.

Figure 1B:
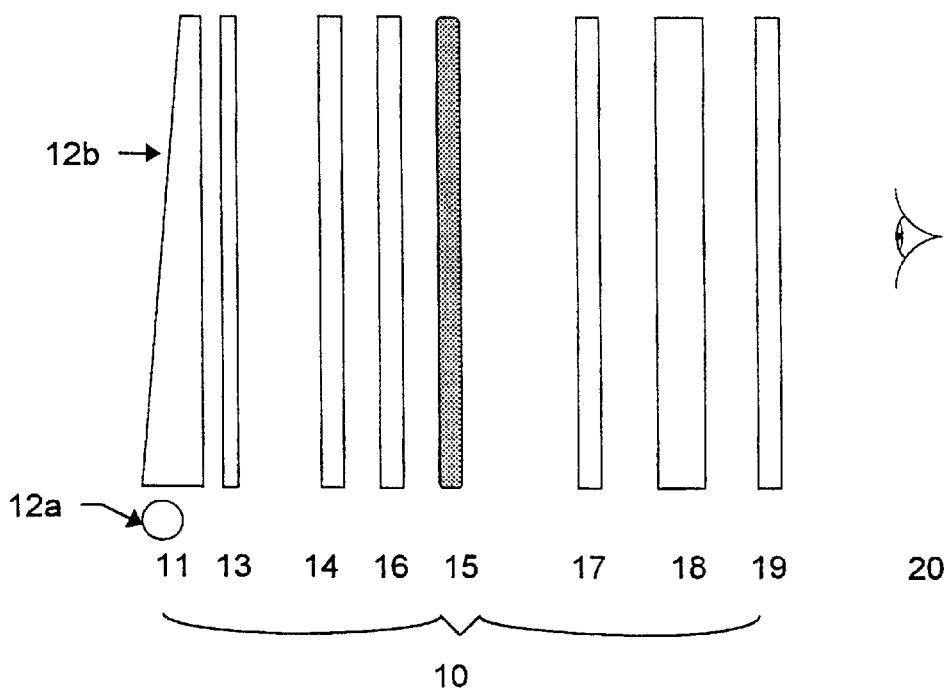

FIG. 1b depicts a display device according to another preferred embodiment of the invention having essentially the same construction as that shown in FIG. 1a, with the modification being that the inventive optical retardation film 15 is placed behind the compensation film 16 when looking from the direction of incident light.

As described above, the high efficiency of the reflective polarizer is achieved by making use of the light reflected by the reflective polarizer after it has been reversed, for example in the backlight unit of the display, and redirected back again to the polarizer.

One preferred embodiment of the present invention is characterized in that the means to produce linear polarized light is comprising a reflector in order to re-reflect circular polarized light reflected by the reflective polarizer. This can be for example a metallic or a non metallic reflector.

In case a metallic reflector is used the light coming from the reflective polarizer is re-reflected as circularly polarized light with opposite twist sense. This reflected circular polarized light is then compatible with the molecular helix of the reflective polarizer and is fully transmitted by the reflective polarizer.

In case a non metallic reflector is used, the light coming from the reflective polarizer is depolarized and interacts again with the reflective polarizer as described above. Depolarization of the light reflected by the reflective polarizer can also occur due to internal reflection and/or refraction in and/or between the optical components of the display.

In another preferred embodiment of the present invention the means to produce substantially linear polarized light comprises at least one diffuser film or sheet situated between the backlight and the reflective polarizer in order to optimize the angular distribution of the light incident on the reflective polarizer and/or to depolarize light redirected onto the reflective polarizer by the reflector as described above.

The means to produce substantially linear polarized light according to the present invention may also comprise one or more adhesive layers provided to at least one of the components comprising the reflective polarizer, the optical retardation film, the compensation film, the linear polarizer and the diffuser sheet(s).

The means to produce substantially linear polarized light according to the present invention can further comprise one or more protective layers provided to at least one of the components comprising the reflective polarizer, the optical retardation film, the compensation film, the linear polarizer, the diffuser sheet(s) and the adhesive layer(s) in order to protect these components against environmental influence.

The inventive optical retardation films are obtainable by coating the mixture of a polymerizable mesogenic material on at least one substrate in form of a layer, aligning the material and polymerizing the aligned material. As a substrate for example a glass or quartz sheet as well as a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

Planar alignment in the coated layer of the inventive mixture of the polymerizable mesogenic material, i.e. an orientation wherein the mesogenic material has a symmetry axis that has a low tilt angle relative to the plane of the layer, can be achieved for example by shearing the material, e.g. by means of a doctor blade. It is also possible to apply an alignment layer, for example a layer of rubbed polyimide or sputtered $SiO_x$, on top of at least one of the substrates.

An especially preferred embodiment of the present invention is characterized in that planar alignment of the polymerizable mesogenic material is achieved by directly rubbing the substrate, i.e. without applying an additional alignment layer. This is a considerable advantage as it allows a significant reduction of the production costs of the optical retardation film. In this way a low tilt angle can easily be achieved.

The term low tilt angle in connection with the aligned layer of the mesogenic material before and/or after polymerization according to the present invention is indicating in the foregoing and the following that the mesogenic material has a symmetry axis with a tilt angle relative to the plane of the layer that is preferably smaller than 10 degrees, especially preferably smaller than 5 degrees, in particular smaller than 3 degrees and ideally substantially zero degrees.

Preferably a plastic film, in particular a polyester film, e.g. Melinex, or a TAC film are used as a substrate in this preferred embodiment.

It is also possible to use a polymer film as a substrate, which is annealed after rubbing near the glass transition temperature $T_g$ of the polymer in order to reduce the tilt angle. For example, when using a Melinex film ($T_g$ 140° C.) as a substrate, the substrate can be rubbed and subsequently annealed for 20 to 40 minutes at a temperature of about 130 to 140° C.

When using an anisotropic substrate like e.g. a Melinex film, the alignment quality is depending on the rubbing angle, i.e. the angle between the major rubbing direction and the major optical symmetry axis of the anisotropic substrate. Preferably rubbing is carried out unidirectionally in a direction substantially parallel to the major symmetry axis of the substrate.

For example rubbing can be achieved by means of a rubbing cloth or with a flat bar coated with a rubbing cloth.

In another preferred embodiment of the present invention rubbing is achieved by means of a at least one rubbing roller, like e.g. a fast spinning roller that is brushing over the substrate, or by putting the substrate between at least two rollers, wherein in each case at least one of the rollers is optionally covered with a rubbing cloth.

In another preferred embodiment of the present invention rubbing is achieved by wrapping the substrate at least partially at a defined angle around a roller that is preferably coated with a rubbing cloth.

Figure 6:
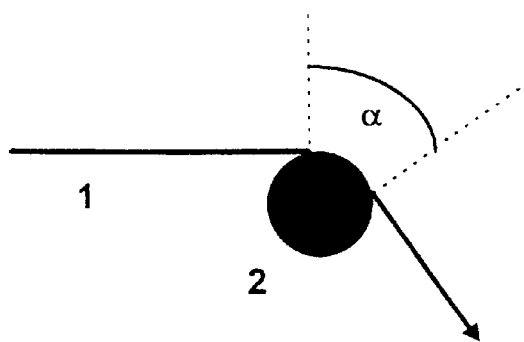
FIG. 6 shows a method of rubbing a substrate for the use in the process of preparing an inventive optical retardation film.

This method is exemplarily described by FIG. 6, that depicts a substrate 1, like e.g a plastic web, which is wrapped at an angle a around a rotating roller 2, with the arrow indicating the moving direction of the web 1. The roller 2 may also be covered by a rubbing cloth. An inventive polymerizable mesogenic mixture being coated on the web 1 that was rubbed by this method shows planar alignment of a high uniformity with a very low or even substantially no tilt.

As rubbing cloth all materials can be used that are known to the skilled in the art for this purpose. For example velvet of a commercially available standard type can be used as a rubbing cloth.

Preferably rubbing is carried out only in one direction.

The ability of the substrate to induce alignment in an inventive polymerizable mesogenic composition coated on this substrate after rubbing the substrate will depend on the process parameters of the rubbing process, like the rubbing pressure and rubbing speed and, in case a rubbing roller is used, on the rotational velocity of the roller, the rubbing roller circumference and the tension on the substrate.

The rubbing length in the rubbing process according to the above described preferred embodiments is preferably from 0.2 to 5 meters, in particular from 0.5 to 3 meters, most preferably from 1.0 to 2.5 meters.

Polymerization of the inventive polymerizable mesogenic mixture takes place by exposing it to heat or to actinic radiation. Actinic radiation means irradiation with light, X-rays, gamma rays or irradiation with high energy particles, such as ions or electrons. In particular preferably UV light is used. The irradiation wavelength is preferably from 250 nm to 420 nm, especially preferably from 320 nm to 390 nm.

As a source for actinic radiation for example a single UV lamp or a set of UV lamps can be used. When using a high lamp power the curing time can be reduced. The irradiance produced by the lamp used in the invention is preferably from 0.01 to 100 mW/cm$^2$, especially preferably from 10 to 50 mW/cm$^2$.

The curing time is dependening, inter alia, on the reactivity of the polymerizable mesogenic material, the thickness of the coated layer, the type of polymerization initiator and the power of the UV lamp. For mass production short curing times are preferred. The curing time according to the invention is preferably not longer than 30 minutes, especially preferably not longer than 15 minutes and very particularly preferably shorter than 8 minutes.

The polymerization is carried out in the presence of an initiator absorbing the wavelength of the actinic radiation. For example, when polymerizing by means of UV light, a photoinitiator can be used that decomposes under UV irradiation to produce free radicals that start the polymerization reaction. As a photoinitiator for radicalic polymerization a commercially available photoinitiator like e.g. Irgacure 651 (by Ciba Geigy A G, Basel, Switzerland) can be used.

It is also possible to use a cationic photoinitiator, when curing reactive mesogens with for example vinyl and epoxide reactive groups, that photocures with cations instead of free radicals. The polymerization may also be started by an initiator that initiates the polymerization when heated above a certain temperature.

In addition to light- or temperature-sensitive initiators the polymerizable mixture may also comprise one or more other suitable components such as, for example, catalysts, stabilizers, co-reacting monomers or surface-active compounds.

In a preferred embodiment of the invention, the polymerizable mixture comprises a stabilizer that is used to prevent undesired spontaneous polymerization for example during storage of the mixture. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

The polymerizable mixture according to this preferred embodiment preferably comprises a stabilizer as described above at an amount of 1 to 1000, especially preferably 10 to 500 ppm.

Other additives, like e.g. chain transfer agents, can also be added to the polymerizable mixture in order to modify the physical properties of the inventive polymer film. For example when adding a chain transfer agent to the polymerizable mixture, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the polymerizable mixture comprises 0.01 to 10%, in particular 0.1 to 5%, very preferably 0.5 to 3% of a chain transfer agent. The polymer films according to this preferred embodiment show especially good adhesion to a substrate, in particular to a plastic film, like e.g. a TAC film.

As a chain transfer agent for example monofunctional thiol compounds like e.g. dodecane thiol or multifunctional thiol compounds like e.g. trimethylpropane tri(3-mercaptopropionate) can be used.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain polymer films with good alignment the polymerization has to be carried out in the liquid crystal phase of the polymerizable mesogenic mixture. Therefore preferably a polymerizable mesogenic mixture is used that has a low melting point, preferably a melting point of 100° C. or lower, in particular 60° C. or lower, so that curing can be carried out in the liquid crystalline phase of the mixture at low temperatures. This is simplifying the polymerization process as less heating of the mixture is required and there is less strain of the mesogenic materials, the substrates and the production equipment during polymerization. This is of importance especially for mass production. Curing temperatures below 100° C. are preferred. Especially preferred are curing temperatures below 60° C.

The thickness of the inventive optical retardation film obtained by the method as described above is preferably 0.2 to 10 µm, in particular 0.5 to 5 µm, most preferably 1 to 3 µm.

In another preferred embodiment of the present invention the thickness of the inventive optical retardation film is 8 to 30 µm, in particular 10 to 20 µm.

In a particularly preferred embodiment of the invention the optical retardation film is used together with a broadband reflective polarizer and optionally a compensation film. The optical retardation film may be connected to the reflective polarizer and/or the compensation film as a separate optical element. Preferably, the reflective polarizer and/or the compensation film and the optical retardation film are integrated so that they form an individual optical element. This can be done for example by laminating the optical retardation film and the reflective polarizer together and/or the compensation film after manufacturing the optical retardation film.

The polymerizable mesogenic material can also be coated and cured directly onto a reflective polarizer which serves as a substrate, thus simplifying the production process.

Alternatively it is also possible that the polymerizable mesogenic material is coated and cured onto a compensation film which serves as a substrate.

In another preferred embodiment of the present invention, the broadband reflective polarizer and/or the compensation film of the inventive combination of optical elements are comprising a layer of an anisotropic polymer material that is obtained by polymerizing an oriented layer of reactive mesogens. Particularly preferably these reactive mesogens have a similar structure like the reactive mesogenic compounds of formula I as described above and below.

Thus, when using an inventive optical retardation film together with a broadband reflective polarizer and/or a compensation film according to this preferred embodiment, it is possible to adapt the optical properties of the optical retardation film to those of the reflective polarizer and/or the compensation film by using materials comprising in principal a similar type of compounds. In this way a combination of an optical retardation film and a reflective polarizer and/or a compensation film with superior optical performance can be obtained.

In a preferred embodiment the polymerizable mixture comprises reactive mesogenic compounds having two or more polymerizable functional groups (multifunctional compounds). Upon polymerization of such a mixture a three-dimensional polymer network is formed. An optical retardation film made of such a network is self-supporting and shows a high mechanical and thermal stability and a low temperature dependence of its physical and optical properties.

Thus, for example inventive optical retardation films can be obtained that exhibit an excellent thermal stability of the optical retardation, which does not change significantly when heating the film up to 120° C.

In another preferred embodiment the polymerizable mixture comprises 0 to 20% of a non mesogenic compound with two or more polymerizable functional groups to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

By varying the concentration of the multifunctional mesogenic or non mesogenic compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

The terms polymerizable or reactive mesogen, polymerizable or reactive mesogenic compound, polymerizable or reactive liquid crystal (compound) and polymerizable or reactive liquid crystalline compound as used in the foregoing and the following comprise compounds with a rodlike, boardlike or disklike mesogenic group. These mesogenic compounds do not necessarily have to exhibit mesophase behaviour by themselves. It is also possible that they show mesophase behaviour in mixtures with other compounds or after polymerization of the pure mesogenic compounds or of the mixtures comprising the mesogenic compounds.

Preferably the reactive mesogenic compounds exhibit mesophase behaviour on their own.

In a particularly preferred embodiment of the present invention, the reactive mesogens comprised by the mixture of the polymerizable mesogenic material are compounds of formula I

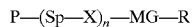   P—(Sp—X)$_n$—MG—R    I wherein
P is a polymerizable group,
Sp is a spacer group having 1 to 20 C atoms,
X is a group selected from —O—, —S—, —CO—, —COO—, —OCO—, —OCOO— or a single bond,
n is 0 or 1,
MG is a mesogenic or mesogenity supporting group, preferably selected according to formula II

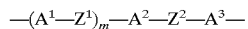   —(A$^1$—Z$^1$)$_m$—A$^2$—Z$^2$—A$^3$—    II wherein
A$^1$, A$^2$ and A$^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl,
Z$^1$ and Z$^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond and
m is 0, 1 or 2, and R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P—(Sp—X)$_n$—.

Particularly preferred are polymerizable mixtures comprising at least two reactive mesogenic compounds at least one of which is a compound of formula I.

In another preferred embodiment of the invention the reactive mesogenic compounds are selected according to formula I, wherein R has one of the meanings of P—(Sp—X)$_n$— as given above.

Bicyclic and tricyclic mesogenic compounds are preferred.

Halogen is preferably F or Cl.

Of the compounds of formula I especially preferred are those in which R is F, Cl, cyano, alkyl or alkoxy or has the meaning given for P—(Sp—X)$_n$—, and MG is of formula II wherein Z$^1$ and Z$^2$ are —COO—, —OCO—, —CH$_2$—CH$_2$—, —CH═CH—COO—, —OCO—CH═CH— or a single bond. A smaller group of preferred mesogenic groups of formula II is listed below. For reasons of simplicity, Phe in these groups is 1,4-phenylene, Phe L is a 1,4-phenylene group which is substituted by at least one group L, with L being F, Cl, CN or an optionally fluorinated alkyl, alkoxy or alkanoyl group with 1 to 4 C atoms, and Cyc is 1,4-cyclohexylene.

| | |
|---|---|
| -Phe-Z$^2$-Phe- | II-1 |
| -Phe-Z$^2$-Cyc- | II-2 |
| -PheL-Z$^2$-Phe- | II-3 |
| -PheL-Z$^2$-Cyc- | II-4 |
| -Phe-Z$^2$-PheL- | II-5 |
| -Phe-Z$^1$-Phe-Phe- | II-6 |
| -Phe-Z$^1$-Phe-Cyc- | II-7 |
| -Phe-Z$^1$-Phe-Z$^2$-Phe- | II-8 |
| -Phe-Z$^1$-Phe-Z$^2$-Cyc- | II-9 |
| -Phe-Z$^1$-Cyc-Z$^2$-Phe- | II-10 |
| -Phe-Z$^1$-Cyc-Z$^2$-Cyc- | II-11 |
| -Phe-Z$^1$-PheL-Z$^2$-Phe- | II-12 |
| -Phe-Z$^1$-Phe-Z$^2$-PheL- | II-13 |
| -PheL-Z$^1$-Phe-Z$^2$-PheL- | II-14 |
| -PheL-Z$^1$-PheL-Z$^2$-Phe- | II-15 |
| -PheL-Z$^1$-PheL-Z$^2$-PheL- | II-16 |

In these preferred groups Z$^1$ and Z$^2$ have the meaning given in formula I described above. Preferably Z$^1$ and Z$^2$ are —COO—, —OCO—, —CH$_2$CH$_2$— or CH═CH—COO—.

L is preferably F, Cl, CN, NO$_2$, CH$_3$, C$_2$H$_5$, OCH$_3$, OC$_2$H$_5$, COCH$_3$, COC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, CH$_3$, OCH$_3$ and COCH$_3$.

Particularly preferred are compounds wherein MG is selected from the following formulae

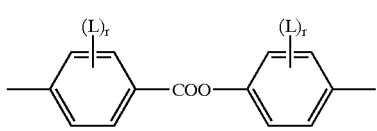
IIa

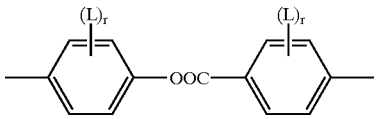
IIb

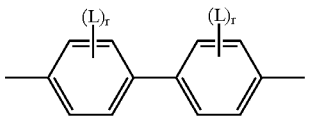
IIc

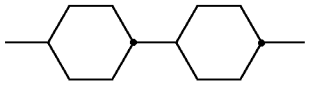
IId

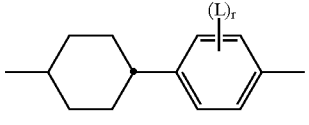
IIe

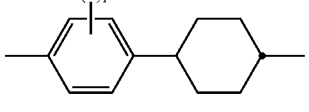
IIf

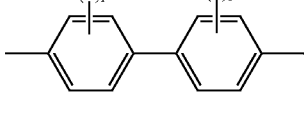
IIg

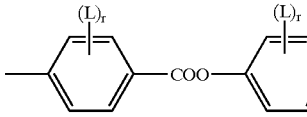
IIh

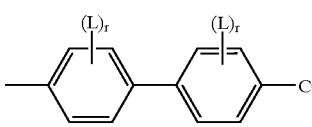
IIi

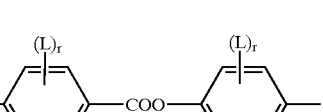
IIk

IIm

IIn wherein L has the meaning given above and r is 0, 1 or 2.

The group

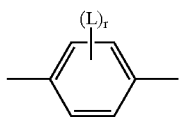

in this preferred formulae is preferably denoting

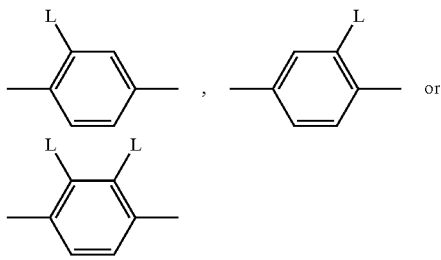

furthermore

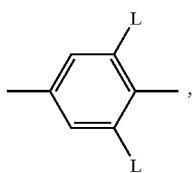

with L having each independently one of the meanings given above.

If R as given in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8-, or 9-oxadecyl, for example.

In addition, mesogenic compounds of the formula I containing a branched group R can be of importance as comonomers, for example, as they reduce the tendency towards crystallization. Branched groups of this type generally do not contain more than one chain branch. Preferred branched groups are isopropyl, isobutyl (=methylpropyl), isopentyl (=3-methylbutyl), isopropoxy, 2-methylpropoxy and 3-methylbutoxy.

P in formula I is preferably selected form CH$_2$=CW—COO—, WCH=CH—O—,

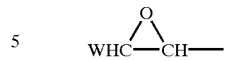

or CH$_2$=CH-Phenyl-(O)k— with W being H, CH$_3$ or Cl and k being 0 or 1,

P is particularly preferably a vinyl group, an acrylate group, a methacrylate group, a propenyl ether group or an epoxy group, very particularly preferably an acrylate or methacrylate group.

As for the spacer group Sp in formula I, Ia and Ib all groups can be used that are known for this purpose to the skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more non-adjacent CH$_2$ groups may be replaced by —O—, —S—, —NH—, —N(CH$_3$)—, —CO—, —O—CO—, —S—CO—, —O—COO—, 'CO—S—, —CO—O—, —CH(halogen)—, —CH(CN)—, —CH=CH— or —C≡C—.

Typical spacer groups Sp are for example —(CH$_2$)$_o$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, with o being an integer from 2 to 12 and r being an integer from 1 to 3.

Preferred spacer groups Sp are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene and 1-methylalkylene, for example.

In the event that R or Q$^2$ is a group of formula P—Sp—X— or P—Sp— respectively, the spacer groups on each side of the mesogenic core may be identical or different.

In particular preferred are compounds of formula I wherein n is 1.

In another preferred embodiment, the inventive optical retardation film is obtained by copolymerizing mixtures comprising compounds of formula I wherein n is 0 and compounds of formula I wherein n is 1.

Typical examples representing polymerizable mesogenic compounds of the formula I can be found in WO 93/22397, EP 0,261,712; DE 195,04,224; De 4,408,171 or DE 4,405, 326. The compounds disclosed in these documents, however are to be regarded merely as examples that should not limit the scope of this invention.

Furthermore, typical examples representing polymerizable mesogenic compounds are shown in the following list of compounds, which is, however, to be understood only as illustrative without limiting the scope of the present invention:

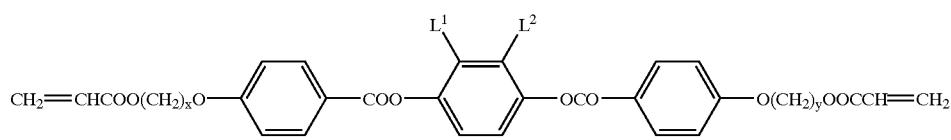

Ia

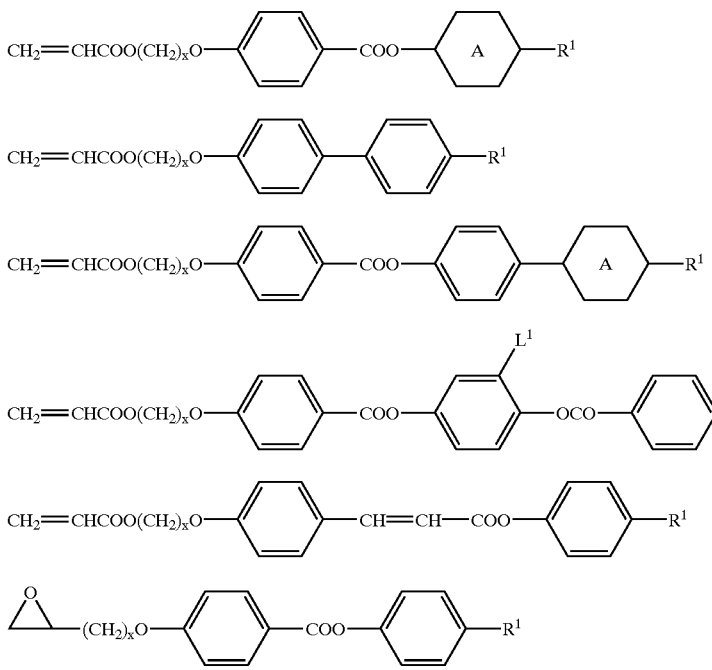

In these compounds x and y are each independently 1 to 12, A is a 1,4-phenylene or 1,4-cyclohexylene group, $R^1$ is halogen, cyano or an alkyl or alkoxy group with 1 to 12 C atoms and $L^1$ and $L^2$ are each independently H, Halogen, CN, or an alkyl, alkoxy or alkanoyl group with 1 to 7 C atoms.

The reactive mesogenic compounds disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

In a preferred embodiment of the present invention, the optical retardation film is obtainable from a mixture of a polymerizable mesogenic material comprising the following components a1) 15 to 95%, preferably 20 to 90% by weight of at least one mesogen according to formula I having one polymerizable functional group, a2) 5 to 80%, preferably 8 to 70%, in particular 10 to 50% by weight of at least one mesogen according to formula I having two or more polymerizable functional groups, b) 0.01 to 5% by weight of an initiator, c) 0 to 20% by weight of a non-mesogenic compound having two or more polymerizable functional groups, d) 0 to 1000 ppm of a stabilizer, and e) 0 to 5% by weight of a chain transfer agent.

Mixtures according to this particularly preferred embodiment are preferred that comprise one to eight, in particular one to six, most preferably one to three different mesogens according to formula I having one polymerizable functional group.

The mixture according to this particularly preferred embodiment especially preferably contains less than 10% by weight, very especially preferably none of the compounds of component c).

In another embodiment of the present invention, the mixture of the polymerizable mesogenic material comprises a1) 15 to 99%, preferably 40 to 99%, in particular 70 to 99% by weight of at least one mesogen according to formula I having one polymerizable functional group, a2) 0 to 90% by weight of at least one mesogen according to formula I having two or more polymerizable functional groups, b) 0.01 to 5% by weight of an initiator, c) 0 to 20% by weight of a non-mesogenic compound having two or more polymerizable functional groups, d) 0 to 1000 ppm of a stabilizer, and e) 0 to 5% by weight of a chain transfer agent.

Mixtures according to this particularly preferred embodiment are preferred that comprise one to eight, in particular one to six, most preferably one to three different mesogens according to formula I having one polymerizable functional group.

Further preferred are mixtures according this preferred embodiment that comprise 15 to 99% by weight of at least two different mesogens of component a1) and further comprises components b) and optionally component a2), c), d) and e) as described above.

Mixtures according to this particularly preferred embodiment are preferred that comprise two to eight, in particular two to six, most preferably two to four different mesogens according to formula I having one polymerizable functional group.

Further preferred are mixtures according to this particularly preferred embodiment that comprise four or more, in particular four to eight, very particularly four to six different mesogens according to formula I having one polymerizable functional group.

The ratio of each of the mesogens according to formula I having one polymerizable functional group in the mixture according to this particularly preferred embodiment is preferably 5 to 90%, in particular 10 to 80%, very preferably 15 to 65% by weight of the total mixture.

The mixture according to this particularly preferred embodiment especially preferably contains less than 10% by weight, very especially preferably none of the compounds of component a2).

In the mixtures comprising two or more different mesogens according to formula I having one polymerizable functional group as described above, preferably each of the different mesogens according to formula I is different in at least one of the groups P, Sp, X, $A^1$, $A^2$, $A^3$, $Z^1$, $Z^2$ and R from each other of the mesogens.

The mixtures of a polymerizable mesogenic material as described above are another object of the present invention.

Without further elaboration one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degree Celsius.

EXAMPLE 1

The following mixture was formulated

| compound (1) | 49.5% |
| compound (2) | 49.5% |
| Irgacure 651 | 1.0% |

$CH_2=CHCO_2(CH_2)_3O-\langle\bigcirc\rangle-COO-\langle\bigcirc\rangle(CH_3)-OCO-\langle\bigcirc\rangle-O(CH_2)_3O_2CCH=CH_2$ (1)

$CH_2=CHCO_2(CH_2)_6O-\langle\bigcirc\rangle-COO-\langle\bigcirc\rangle-\langle\bigcirc\rangle-C_3H_7$ (2)

The compounds (1) and (2) have been prepared in analogy to the methods described in WO 93/22397 and DE195,04,224. Irgacure 651 is a photoinitiator for radicalic polymerization which is commercially available from Ciba Geigy AG.

To prepare crosslinked polymer films, the mixture was dissolved in toluene at a concentration of about 20% by weight and filtered to remove impurities and small particles.

A sheet of PET (Melinex 401, available from ICI Corp.) was rubbed unidirectionally 50 to 60 times with a flat aluminium bar coated with velvet. The applied pressure was approximately 2 g/cm$^3$, and the rubbing length was approximately 1.5±0.2 metres.

The toluene mixture was coated as a film with a thickness of approximately 12 µm on the PET sheet and the solvent was allowed to evaporate at 55° C. The mixture was then cured in a nitrogen atmosphere at 55° C. by irradiating with UV light with a wavelength of 350 to 380 nm and an irradiance of 40 mW/cm$^2$ for 4 minutes.

In this way, two crosslinked polymer films (1a, 1b) with different thickness were obtained that can be used as a retardation film.

EXAMPLE A

The films 1a and 1b obtained as described in example 1 were removed from the PET substrate and their retardation was measured on a glass slide on an Olympus polarizing microscope using a Berek compensator. The film 1a has a retardation value of 134 nm, and the film 1b a retardation value of 154 nm.

Figure 2:
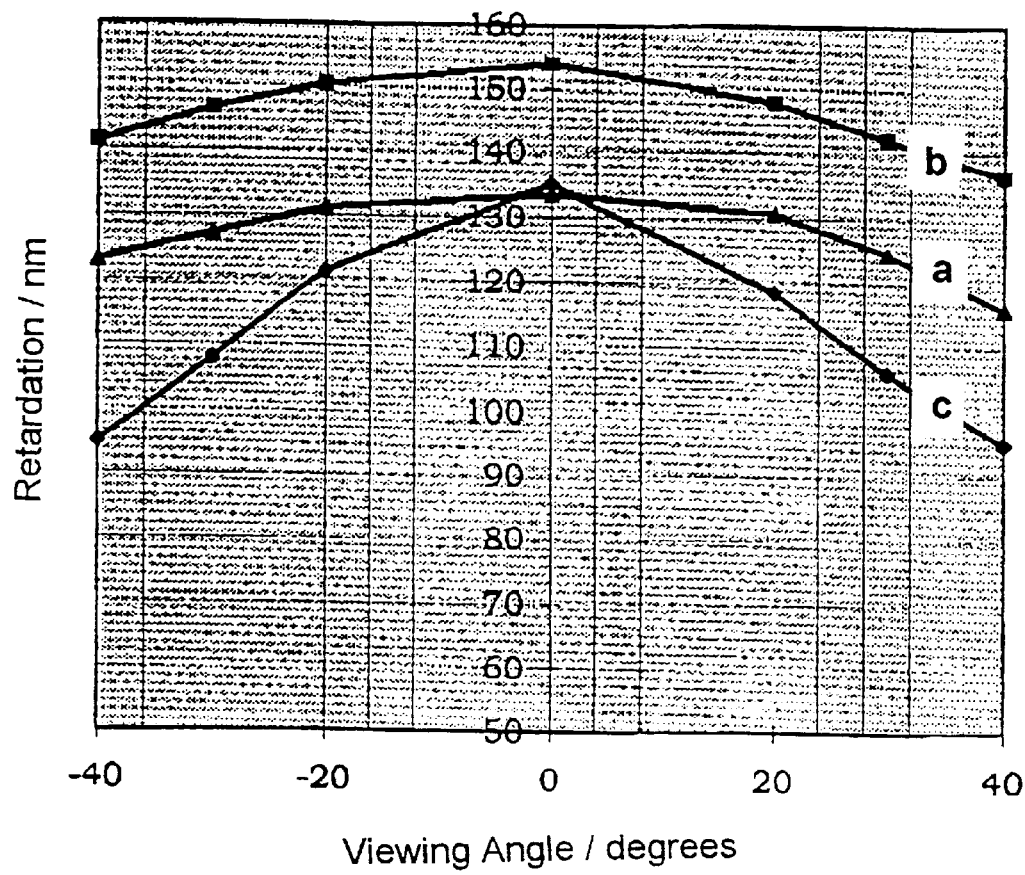
FIG. 2 shows the retardation versus viewing angle of inventive optical retardation films compared to a state of the art optical retardation film.

FIG. 2 shows the change of the retardation depending on the viewing angle for a sample of the inventive optical quarter wave retardation films 1a (curve 2a) and 1b (curve 2b) in comparison to a standard QWF based on PVA (curve 2c). It can be clearly seen that the viewing angle dependence of both inventive optical quarter wave retardation films is lower than that of the PVA film.

EXAMPLE B

The optical performance of the inventive retardation film was determined in an inventive optical combination together with a broad band cholesteric reflective polarizer.

Figure 4:
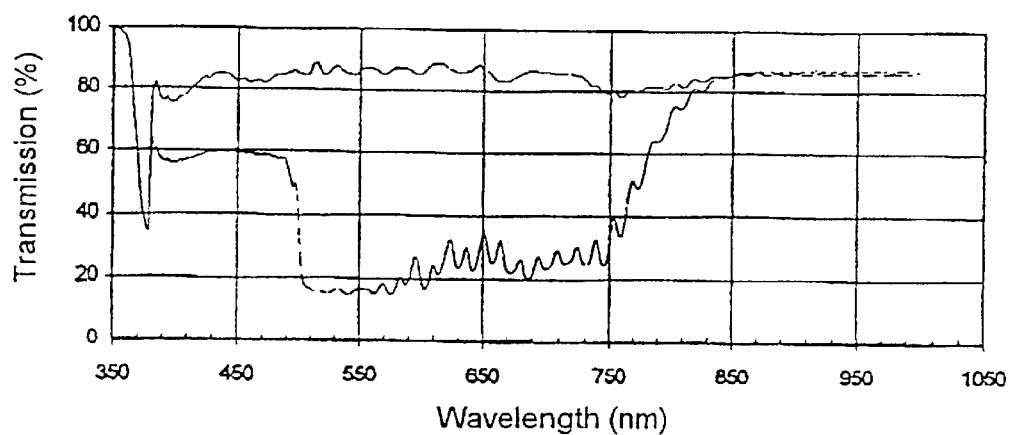
FIG. 4 shows the spectrum of a broad waveband reflective polarizer that is used in combination together with an inventive optical retardation film in a special embodiment of the invention.

The broad waveband reflective polarizer film consisted of a polymerized mixture comprising chiral and achiral reactive mesogenic compounds. The polarizer exhibited a cholesteric structure with planar orientation with multiple pitch lengths of the cholesteric helix and had a broad wavelength reflection band as shown in FIG. 4 which is ranging from wavelength values of 500 to 800 nm with a bandwidth of about 300 nm.

The retardations of the films 1a (134 nm) and 1b (154 nm) are 0.25 times a value lying inside the waveband reflected by the broadband reflective polarizer, therefore each of these two films, when used together with the reflective polarizer, can act as a quarter wave film.

Figure 3:
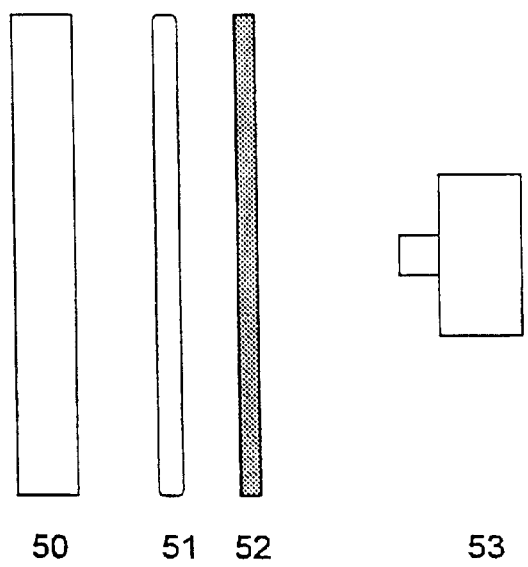
FIG. 3 shows the measurement setup according to example B of the present invention.
Figure 5:
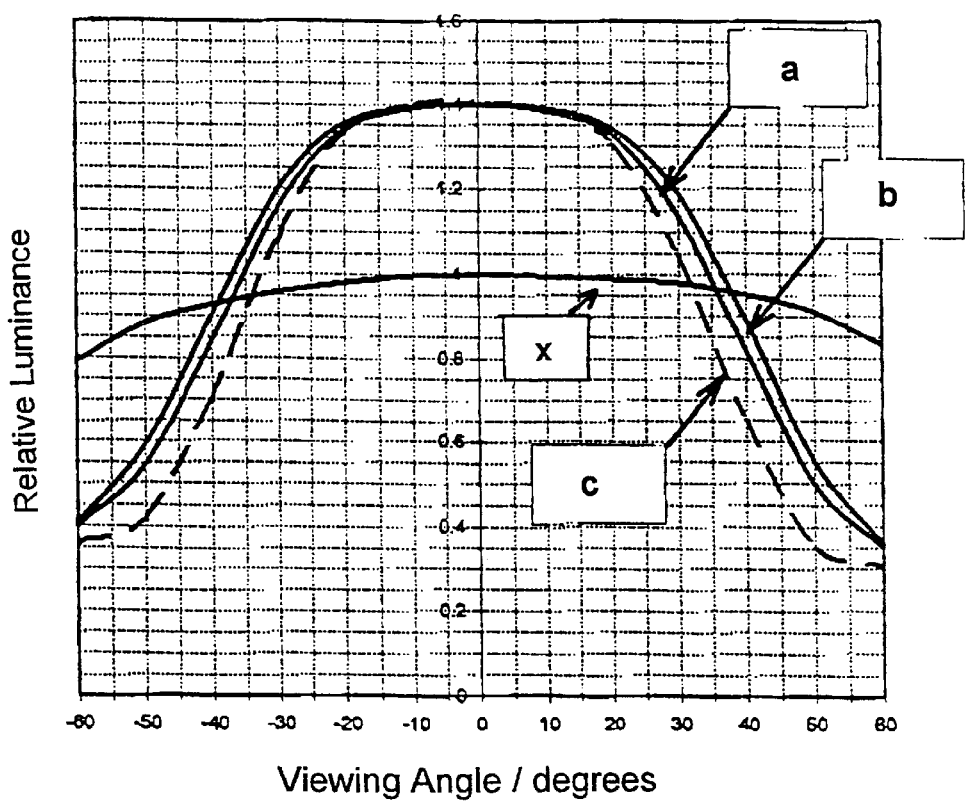
FIG. 5 shows the relative luminance versus viewing angle for inventive combinations of a broad waveband reflective polarizer and an inventive optical retardation film compared to a combination of a broad waveband reflective polarizer with a state of the art optical retardation film.

FIG. 3 depicts the measurement setup. The luminance of light from a commercial LCD backlight 50 passing through an assembly with the reflective polarizer 51 and the inventive optical retardation films 1a and 1b of example 1 (52) was measured using a Minolta CS-100 colour camera 53 at a range of viewing angles (−60° to +60°). The experiment was repeated with a similar assembly, wherein the inventive optical quarter wave retardation films were replaced by the standard QWF based on PVA as used in example A. The measurement results are shown in FIG. 5.

Curve 5x depicts the luminance of the LCD backlight 50 together with the reflective polarizer 51. Curves 5a, 5b and 5c show the luminance of the LCD backlight 50 and a combination of the reflective polarizer 51 together with an optical retardation film 52 that is either one of the inventive optical retardation films 1a (curve 5a) or 1b (curve 5b) or the standard QWF (curve 5c).

The luminance of the assembly comprising the inventive optical retardation films 1a (curve 5a) and 1b (curve 5b) is higher than that of the assembly comprising the QWF based on PVA (curve 5c) over the whole range of measured viewing angles, and the cross-over angle $\alpha_c$ is increased by about 5 to 6 degrees.

The optical retardation film 52 and the broadband reflective polarizer 51 in FIG. 3 according to example B were not optically coupled. If they are laminated together, or if the reflective polarizer is prepared by polymerization of a mixture of reactive cholesteric mesogenic compounds using the optical retardation film as a substrate, the cross over angle $\alpha_c$ is being further increased.

The results of experiments according to example A and B clearly demonstrate the improved properties of an inventive optical retardation film compared to an optical retardation film of the state of the art, especially when used in combination with a broadband cholesteric reflective polarizer.

EXAMPLE C

A PET web substrate for planar alignment was prepared by rubbing according to a preferred embodiment of the present invention. Rubbing was carried out as depicted in FIG. 6 by wrapping the PET web 1 at a wrap angle $\alpha$ of 65° around a velvet coated roller 2 with a circumference of 125 cm, which was rotating with a velocity of 300 rpm, The web speed was 1750 cm/min and the tension on the web was 5 lbs/inch. This resulted in a rubbing length of 1335 mm. An inventive polymerizable mesogenic mixture coated on this PET substrate showed planar alignment of a high uniformity with substantially no tilt.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A combination of optical elements comprising at least one optical retardation film and at least one broadband reflective polarizer, wherein said optical retardation film comprises at least one layer of an anisotropic polymeric material having an optical symmetry axis which has a tilt angle relative to the plane of the layer of 0°–25°, said optical retardation film is obtained by polymerization of a mixture of a polymerizable mesogenic material comprising
    a) at least one reactive mesogen having at least one polymerizable functional group,
    b) an initiator,
    c) optionally a non-mesogenic compound having two or more polymerizable functional groups, and
    d) optionally a stabilizer.

2. A combination of optical elements according to claim 1, characterized in that the retardation of the optical retardation film is from 50 to 250 nm.

3. A combination of optical elements according to claim 1, wherein the bandwidth of wavelength reflected by the broadband reflective polarizer is at least 100 nm.

4. A combination of optical elements according to claim 1, further comprising a compensation film comprising a layer of an anisotropic polymeric material with a homeotropic or tilted homeotropic orientation, wherein the compensation film is positioned adjacent to either side of the optical retardation film.

5. A combination of optical elements according to claim 4, further comprising a linear polarizer, and wherein the optical retardation film and the compensation film are positioned between the broadband reflective polarizer and the linear polarizer.

6. A device for producing substantially linear polarized light comprising the following components
    I) a combination of optical elements according to claim 1,
    II) a radiation source, and
    III) optionally a diffusor adjacent to the radiation source, wherein components I to III are arranged whereby the broadband reflective polarizer of component I is facing the radiation source of component II or, optionally, the diffusor of component diffusor III.

7. An optical retardation film comprising at least one layer of an anisotropic polymeric material having an optical symmetry axis which has a tilt angle relative to the plane of the layer of 0°–25°, wherein said optical retardation film is obtained by
    A) coating mixture of a polymerizable mesogenic material comprising
       a) at least one reactive mesogen having at least one polymerizable functional group,
       b) an initiator,
       c) optionally a non-mesogenic compound having two or more polymerizable functional groups, and
       d) optionally a stabilizer
    on a substrate or between two substrates in form of a layer,
    B) aligning the polymerizable mesogenic material such that the optical symmetry axis has a tilt angle relative to the plane of the layer of 0°–25°,
    C) polymerizing said mixture by exposing it to heat or actinic radiation,
    D) optionally repeating the steps A), B) and C) at least one more time, and
    E) optionally removing at least one substrate from the polymerized material.

8. An optical retardation film according to claim 7, wherein the substrate onto which the polymerizable mesogenic material is coated in step B) is a plastic sheet or film.

9. An optical retardation film according to claim 7, wherein alignment of the polymerizable mesogenic material is achieved by directly rubbing at least one of the substrates onto which the polymerizable mesogenic material is coated in step B).

10. An optical retardation film according to claim 7, wherein the mixture of the polymerizable mesogenic material comprises at least one reactive mesogen having one polymerizable functional group and at least one reactive mesogen having two or more polymerizable functional groups.

11. An optical retardation film according to claim 7, wherein said reactive mesogens are compounds of formula I

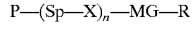

P—(Sp—X)$_n$—MG—R     I wherein

P is a polymerizable group,

Sp is a spacer group having 1 to 20 C atoms,

X is a group selected from —O—, —S—, —CO—, —COO—, —OCO—, —OCOO— or a single bond, n is 0 or 1, MG is a group according to formula II $$—(A^1—Z^1)_m—A^2—Z^2—A^3—$$  II wherein $A^1$, $A^2$ and $A^3$ are independently from each other 1,4-phenylene, 1,4-phenylene in which one or more CH groups is replaced by N, 1,4-cyclohexylene, 1,4-cyclohexylene in which one or two non-adjacent $CH_2$ groups is replaced in each case by O or S, 1,4-cyclohexenylene or naphthalene-2,6-diyl, wherein these groups are unsubstituted, or mono- or polysubstituted by halogen, cyano, or nitro groups or alkyl, alkoxy or alkanoyl groups having 1 to 7 C atoms wherein one or more H atoms are in each case optionally replaced by F or Cl, $Z^1$ and $Z^2$ are each independently —COO—, —OCO—, —$CH_2CH_2$—, —$OCH_2$—, —$CH_2O$—, —CH=CH—, —C≡C—, —CH=CH—COO—, —OCO—CH=CH— or a single bond, m is 0, 1 or 2, and R is an alkyl radical with up to 25 C atoms which is unsubstituted, or is mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, or R is halogen, cyano or has independently one of the meanings given for P—(Sp—X)$_n$—.

12. An optical retardation film according to claim 11, wherein the mixture of the polymerizable mesogenic material consists essentially of a1) 15 to 95% by weight of at least one mesogen according to formula I having one polymerizable functional group, a2) 5 to 80% by weight of at least one mesogen according to formula I having two or more polymerizable functional groups, b) 0.01 to 5% by weight of an initiator, c) 0 to 20% by weight of a non-mesogenic compound having two or more polymerizable functional groups, d) 0 to 1000 ppm of a stabilizer, and e) 0 to 5% by weight of a chain transfer agent.

13. In a liquid crystal display device comprising a liquid crystal cell and a means to produce substantially linear polarized light comprising a combination of optical elements, the improvement wherein said combination of optical elements comprises an optical retardation film according to claim 7.

14. A mixture of polymerizable mesogenic material comprising:

a1) 15 to 95% by weight of at least one mesogen according to formula I having one polymerizable functional group, $$P—(Sp—X)_n—MG—R$$  I wherein P is a polymerizable group, Sp is a spacer group having 1 to 20 C atoms, X is a group selected from —O—, —S—, —CO—, —COO—, —OCO—, —OCOO— or a single bond, n is 1, MG is a group according to formula II $$—(A^1—Z^1)_m—A^2—Z^2—A^3—$$  II wherein $A^1$, $A^2$ and $A^3$ are independently from each other 1,4-phenylene, 1,4-phenylene in which one or more CH groups is replaced by N, 1,4-cyclohexylene, 1,4-cyclohexylene in which one or two non-adjacent $CH_2$ groups is replaced in each case by O or S, 1,4-cyclohexenylene or naphthalene-2,6-diyl, wherein these groups are unsubstituted, or mono- or polysubstituted by halogen, cyano, or nitro groups or alkyl, alkoxy or alkanoyl groups having 1 to 7 C atoms wherein one or more H atoms are in each case optionally replaced by F or Cl, $Z^1$ and $Z^2$ are each independently —COO—, —OCO—, —$CH_2CH_2$—, —$OCH_2$—, —$CH_2O$—, —CH=CH—, —C≡C—, —CH=CH—COO—, —OCO—CH=CH— or a single bond, m is 0, 1 or 2, and R is an alkyl radical with up to 25 C atoms which is unsubstituted, or is mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, or R is halogen or cyano, a2) 5 to 50% by weight of at least one mesogen according to formula I' having two polymerizable groups P, $$P—(Sp—X)_n—MG—R'$$  I' wherein P, Sp, X, n, and MG are, independently, as defined above and R' is a group of the formula P—(Sp—X)$_n$— wherein P, Sp X and n are, independently, as defined above, b) 0.01 to 5% by weight of an initiator, c) 0 to 20% by weight of a non-mesogenic compound having two or more polymerizable functional groups, d) 0 to 1000 ppm of a stabilizer, and e) 0 to 5% by weight of a chain transfer agent.

15. A combination of optical elements according to claim 1 further comprising a linear polarizer, and wherein the optical retardation film is positioned between the broadband reflective polarizer and the linear polarizer.

16. An optical retardation film according to claim 10, wherein said reactive mesogens are compounds of formula I $$P—(Sp—X)_n—MG—R$$  I wherein P is a polymerizable group, Sp is a spacer group having 1 to 20 C atoms, X is a group selected from —O—, —S—, —CO—, —COO—, —OCO—, —OCOO— or a single bond, n is 0 or 1, MG is a group according to formula II $$—(A^1—Z^1)_m—A^2—Z^2—A^3—$$  II wherein
- $A^1$, $A^2$ and $A^3$ are independently from each other 1,4-phenylene, 1,4-phenylene in which one or more CH groups is replaced by N, 1,4-cyclohexylene, 1,4-cyclohexylene in which one or two non-adjacent CH$_2$ groups is replaced in each case by O or S, 1,4-cyclohexenylene or naphthalene-2,6-diyl,
- wherein these groups are unsubstituted, or mono- or polysubstituted by halogen, cyano, or nitro groups or alkyl, alkoxy or alkanoyl groups having 1 to 7 C atoms wherein one or more H atoms are in each case optionally replaced by F or Cl,
- $Z^1$ and $Z^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond,
- m is 0, 1 or 2, and
- R is an alkyl radical with up to 25 C atoms which is unsubstituted, or is mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or
- R is halogen cyano or has independently one of the meanings given for P—(Sp—X)$_n$—.

17. An optical retardation film according to claim 11, wherein P is CH$_2$=CW—COO—, WCH=CH—O—,

or CH$_2$=CH-Phenyl-(O)$_k$—, W is H, CH$_3$ or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

18. A combination of optical elements according to claim 1, wherein said mixture of polymerizable mesogenic material further comprises one or more surface active compounds.

19. An optical retardation film according to claim 7, wherein said mixture of polymerizable mesogenic material further comprises one or more surface active compounds.

20. A mixture of polymerizable mesogenic material according to claim 14, further comprising one or more surface active compounds.

21. A combination of optical elements according to claim 1, wherein said at least one layer of anisotropic polymeric has an optical symmetry axis with a tilt angle, relative to the plane of the layer, of 0°–15°.

22. A combination of optical elements according to claim 1, wherein said at least one layer of anisotropic polymeric has an optical symmetry axis with a tilt angle, relative to the plane of the layer, of 0°–10°.

23. A combination of optical elements according to claim 1, wherein said at least one layer of anisotropic polymeric has an optical symmetry axis with a tilt angle, relative to the plane of the layer, of 0°–5°.

24. A combination of optical elements according to claim 1, wherein said reactive mesogens are compounds of formula I P—(Sp—X)$_n$—MG—R   I wherein
- P is a polymerizable group,
- Sp is a spacer group having 1 to 20 C atoms,
- X is a group selected from —O—, —S—, —CO—, —COO—, —OCO—, —OCOO— or a single bond,
- n is 0 or 1,
- MG is a group according to formula II

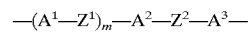

wherein
- $A^1$, $A^2$ and $A^3$ are independently from each other 1,4-phenylene, 1,4-phenylene in which one or more CH groups is replaced by N, 1,4-cyclohexylene, 1,4-cyclohexylene in which one or two non-adjacent CH$_2$ groups is replaced in each case by O or S, 1,4-cyclohexenylene or naphthalene-2,6-diyl,
- wherein these groups are unsubstituted, or mono- or polysubstituted by halogen, cyano, or nitro groups or alkyl, alkoxy or alkanoyl groups having 1 to 7 C atoms wherein one or more H atoms are in each case optionally replaced by F or Cl,
- $Z^1$ and $Z^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond,
- m is 0, 1 or 2, and
- R is an alkyl radical with up to 25 C atoms which is unsubstituted, or is mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or
- R is halogen, cyano or has independently one of the meanings given for P—(Sp—X)$_n$—.

25. A combination of optical elements according to claim 24, wherein P is CH$_2$=CW—COO—, WCH=CH—O—,

or CH$_2$=CH-Phenyl-(O)$_k$—, W is H, CH$_3$or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

26. An optical retardation film according to claim 16, wherein P is CH$_2$=CW—COO—, WCH=CH—O—,

or CH$_2$=CH-Phenyl-(O)$_k$—, W is H, CH$_3$ or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—.

27. A mixture of polymerizable material according to claim 14, wherein P is CH$_2$=CW—COO—, WCH=CH—O—,

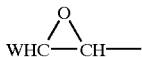

or CH$_2$=CH-Phenyl-(O)$_k$—, W is H, CH$_3$ or Cl, k is 0 or 1, and Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—.

28. A combination of optical elements according to claim 1, wherein said optical retardation film provides a retardation of 50–250 nm.

29. A combination of optical elements according to claim 28, wherein said optical retardation film has a thickness of 0.2–30 μm.

30. A retardation film according to claim 7, wherein said optical retardation film provides a retardation of 50–250 nm.

31. A retardation film according to claim 7, wherein said optical retardation film has a thickness of 0.2–30 μm.

32. An optical retardation film according to claim 11, wherein the mixture of the polymerizable mesogenic material consists essentially of components
   a1) 15 to 99% by weight of at least one mesogen according to formula I having one polymerization functional group,
   a2) 0 to 90% by weight of at least one mesogen according to formula I having two or more polymerizable functional groups,
   b) 0.01 to 5% by weight of an initiator,
   c) 0 to 20% by weight of a non-mesogenic compound having two or more polymerizable functional groups,
   d) 0 to 1000 ppm of a stabilizer, and
   e) 0 to 5% by weight of a chain transfer agent.

33. A film of claim 32, wherein the amount of component a2) is 0%.

34. A mixture of polymerizable mesogenic material comprising components
   a1) 40 to 99% by weight of at least one mesogen according to formula I having one polymerization functional group,

wherein
P is a polymerizable group,
Sp is a spacer group having 1 to 20 C atoms,
X is a group selected from —O—, —S—, —CO—, —COO—, —OCO—, —OCOO— or a single bond,
n is 1,
MG is a group according to formula II

wherein
A$^1$, A$^2$ and A$_3$ are independently from each other 1,4-phenylene, 1,4-phenylene in which one or more CH groups is replaced by N, 1,4-cyclohexylene, 1,4-cyclohexylene in which one or two non-adjacent CH$_2$ groups is replaced in each case by O or S, 1,4-cyclohexenylene or naphthalene-2,6-diyl, wherein these groups are unsubstituted, or mono- or polysubstituted by halogen, cyano, or nitro groups or alkyl, alkoxy or alkanoyl groups having 1 to 7 C atoms wherein one or more H atoms are in each case optionally replaced by F or Cl,
Z$^1$ and Z$_2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond,
m is 0, 1 or 2, and
R is an alkyl radical with up to 25 C atoms which is unsubstituted, or is mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or
R is halogen or cyano,
   a2) >0 to 90% by weight of at least one mesogen according to formula I' having two or more polymerizable functional groups,

wherein P, Sp, X, n, and MG are each independently as defined above,
   b) 0.01 to 5% by weight of an initiator,
   c) 0 to 20% by weight of a non-mesogenic compound having two or more polymerizable functional groups,
   d) 0 to 1000 ppm of a stabilizer, and
   e) 0 to 5% by weight of a chain transfer agent.

35. A mixture of claim 33, wherein said mixture contains two to eight different mesogens of formula I having one polymerizable group.

36. A mixture of claim 34, where wherein P is in each case independently CH$_2$=CW—COO—, WCH=CH—O—, CH$_2$=CH-Phenyl-(O)$_k$—, or

W is H, CH$_3$ or Cl, k is 0 or 1, and
Sp is a linear or branched alkylene group having 1–20 C atoms in which, optionally one or more non-adjacent CH$_2$ groups is in each case replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—.

37. A mixture of claim 14, wherein MG is selected from formulae II-1 to II-16:

| | |
|---|---|
| -Phe-Z$^2$-Phe- | II-1 |
| -Phe-Z$^2$-Cyc- | II-2 |
| -PheL-Z$^2$-Phe- | II-3 |
| -PheL-Z$^2$-Cyc- | II-4 |
| -Phe-Z$^2$-PheL- | II-5 |
| -Phe-Z$^1$-Phe-Phe- | II-6 |
| -Phe-Z$^1$-Phe-Cyc- | II-7 |
| -Phe-Z$^1$-Phe-Z$^2$-Phe- | II-8 |
| -Phe-Z$^1$-Phe-Z$^2$-Cyc- | II-9 |

-continued

| | |
|---|---|
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 | wherein L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

38. A mixture of claim 25, wherein MG is selected from formulae II-1 to II-16:

| | |
|---|---|
| -Phe-$Z^2$-Phe- | II-1 |
| -Phe-$Z^2$-Cyc- | II-2 |
| -PheL-$Z^2$-Phe- | II-3 |
| -PheL-$Z^2$-Cyc- | II-4 |
| -Phe-$Z^2$-PheL- | II-5 |
| -Phe-$Z^1$-Phe-Phe- | II-6 |
| -Phe-$Z^1$-Phe-Cyc- | II-7 |
| -Phe-$Z^1$-Phe-$Z^2$-Phe- | II-8 |
| -Phe-$Z^1$-Phe-$Z^2$-Cyc- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 | wherein L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

39. A mixture of claim 27 wherein MG is selected from formulae II-1 to II-16:

| | |
|---|---|
| -Phe-$Z^2$-Phe- | II-1 |
| -Phe-$Z^2$-Cyc- | II-2 |
| -PheL-$Z^2$-Phe- | II-3 |
| -PheL-$Z^2$-Cyc- | II-4 |
| -Phe-$Z^2$-PheL- | II-5 |
| -Phe-$Z^1$-Phe-Phe- | II-6 |
| -Phe-$Z^1$-Phe-Cyc- | II-7 |
| -Phe-$Z^1$-Phe-$Z^2$-Phe- | II-8 |
| -Phe-$Z^1$-Phe-$Z^2$-Cyc- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | ll-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 | wherein L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

40. A mixture of claim 34, wherein MG is selected from formulae II-1 to II-16:

| | |
|---|---|
| -Phe-$Z^2$-Phe- | II-1 |
| -Phe-$Z^2$-Cyc- | II-2 |
| -PheL-$Z^2$-Phe- | II-3 |
| -PheL-$Z^2$-Cyc- | II-4 |
| -Phe-$Z^2$-PheL- | II-5 |
| -Phe-$Z^1$-Phe-Phe- | II-6 |
| -Phe-$Z^1$-Phe-Cyc- | II-7 |
| -Phe-$Z^1$-Phe-$Z^2$-Phe- | II-8 |

-continued

| | |
|---|---|
| -Phe-$Z^1$-Phe-$Z^2$-Cyc- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 | wherein L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

41. An optical retardation film of claim 7, wherein said film is a quarter wave retardation film.

42. A device according to claim 6, further comprising a metallic or nonmetallic reflector.

43. An optical retardation film according to claim 7, wherein the polymerizable mesogenic material is coated and cured onto a compensation film which serves as a substrate.

44. An optical retardation film according to claim 43, wherein the compensation film that serves as a substrate comprises a layer of anisotropic polymeric material with a homeotropic or tiled homeotropic orientation.

45. An optical retardation film according to claim 7, wherein the polymerizable mesogenic material is coated and cured directly onto a reflective polarizer which serves as a substrate.

46. An optical retardation film according to claim 45, wherein the reflective polarizer is a broadband reflective polarizer.

47. An optical retardation film in combination with a compensation film comprising:
an optical retardation film comprising at least one layer of an anisotropic polymeric material having an optical symmetry axis which has a tilt angle relative to the plane of the layer 0° to 25°, combined with
a compensation film comprising a layer of anisotropic polymeric material with a homeotropic or tiled homeotropic orientation,
wherein each of said optical retardation film and compensation film are obtained by polymerization of an oriented layer of reactive mesogens, and wherein one of said optical retardation film and compensation film is prepared on the other of said films which serves as a substrate.

48. An optical retardation film in combination with a broadband reflective polarizer compromising: an optical retardation film comprising at least one layer of an anisotropic polymeric material having an optical symmetry axis which has a tilt angle relative to the plane of the layer of 0° to 25°, combined with a broadband reflective polarizer film,
wherein each of said optical retardation film and broadband reflective polarizer film are obtained by polymerization of an oriented layer of reactive mesogens, and wherein one of said optical retardation film and broadband reflective polarizer film is prepared on the other of said films which serves as a substrate.

49. In a liquid crystal display device the improvement wherein said device comprises a combination of optical elements according to claim 1.

50. In a liquid crystal display device the improvement wherein said device further comprises a device according to claim 6.

51. In a liquid crystal display device the improvement wherein said device comprises an optical retardation film according to claim 7.

52. An optical retardation film according to claim 7 in combination with a linear polarizer.

53. An optical retardation film according to claim 11 in combination with a linear polarizer.

54. An optical retardation film according to claim 30 in combination with a linear polarizer.

55. An optical retardation film according to claim 32 in combination with a linear polarizer.

56. An optical retardation film according to claim 41 in combination with a linear polarizer.

57. An optical retardation film according to claim 43 in combination with a linear polarizer.

58. An optical retardation film according to claim 44 in combination with a linear polarizer.

59. An optical retardation film according to claim 47 in combination with a linear polarizer.

60. In a liquid crystal display device the improvement wherein said device comprises an optical retardation film according to claim 52.

61. In a liquid crystal display device the improvement wherein said device comprises an optical retardation film according to claim 53.

62. In a liquid crystal display device the improvement wherein said device comprises an optical retardation film according to claim 54.

63. In a liquid crystal display device the improvement wherein said device comprises an optical retardation film according to claim 55.

64. In a liquid crystal display device the improvement wherein said device comprises an optical retardation film according to claim 56.

65. In a liquid crystal display device the improvement wherein said device comprises an optical retardation film according to claim 57.

66. In a liquid crystal display device the improvement wherein said device comprises an optical retardation film according to claim 58.

67. In a liquid crystal display device the improvement wherein said device comprises an optical retardation film according to claim 59.

* * * * *

UNITED STATES PATENT AND TRADEMARK OFFICE
CERTIFICATE OF CORRECTION

PATENT NO. : 6,544,605 B1 Page 1 of 1
APPLICATION NO. : 09/230335
DATED : April 8, 2003
INVENTOR(S) : David Coates et al.

It is certified that error appears in the above-identified patent and that said Letters Patent is hereby corrected as shown below:

On the front page, Inventors: line 1, reads "Dorset" should read -- Blandford Forum --
On the front page, Inventors: line 3, reads "Hampshire" should read -- Ringwood --
On the front page, Inventors: line 3, reads "Dorset" should read -- Wimborne --
Column 21, line 57, reads "characterized in that" should read -- wherein --
Column 22, line 21, reads "coating mixture" should read -- coating a mixture --
Column 22, line 33, reads "0° - 25°." should read -- 0° - 25°, --
Column 24, line 41, reads "Sp X and" should read -- Sp, X and --
Column 25, line 27, reads "halogen cyano or" should read -- halogen, cyano or --
Column 25, line 38, delete comma
Column 25, line 53-54, reads "polymeric has" should read -- polymeric material has --
Column 25, line 57-58, reads "polymeric has" should read -- polymeric material has --
Column 25, line 61-62, reads "polymeric has" should read -- polymeric material has --
Column 27, line 61, reads "$A_3$" should read -- $A^3$ --
Column 28, line 6, reads "$Z_2$" should read -- $Z^2$ --
Column 28, line 36, reads "33" should read -- 34 --
Column 28, line 39, reads "where wherein" should read -- wherein --

Signed and Sealed this

Seventeenth Day of November, 2009

David J. Kappos
*Director of the United States Patent and Trademark Office*